July 26, 1955 — T. J. GLAZA — 2,714,043
CONVEYOR APPARATUS
Filed Nov. 5, 1949

Inventor:
Thaddeus J. Glaza
By Joseph O. Lange
Atty.

United States Patent Office 2,714,043
Patented July 26, 1955

2,714,043

CONVEYOR APPARATUS

Thaddeus J. Glaza, Chicago, Ill., assignor to Crane Co., Chicago, Ill., a corporation Application November 5, 1949, Serial No. 125,712

4 Claims. (Cl. 302—57)

This invention relates to a conveyor apparatus.

More particularly, this invention is concerned with a conveyor which may be used for transporting finely divided solids, granular materials, comminuted matter, such as sand or the like, in a substantially closed system and in a plurality of directions, employing suitably arranged conduits and valves as the conducting means with predeterminedly spaced jet means introduced to accelerate the flow therethrough.

It is one of the more important objects of this invention to provide a conveyor system in which air or similar fluids under pressure may be easily utilized to facilitate quick and easy conveyance of materials, such as fungible goods of the character above referred to.

More specifically, another object of this invention is to provide a conveyor means useful in moving sand in a foundry, for example, from one floor or location to another as from an unloading dock to a receiver or storage bin or to a series of bins, or from a basement to a core room.

It is a further object to provide a construction forming a conveyor system in which previous objections to what is termed "bridging" of the conveyed material is overcome efficiently and which is economical in operation and in maintenance.

Another object is to provide for a construction in which a pressure chamber is suitably maintained in a portion or portions thereof in predetermined turbulence, enhancing a desirable condition for the pulverized material being moved and also enabling the latter to be suitably treated, if desired, during the course of such conveyance or transportation.

The primary object of my invention is to provide a simple improvement in conveying apparatus of the general character above stated, to the end that the apparatus can be made to function in a substantially automatic manner and to operate entirely independent of manual controls.

It will be appreciated that the type of installation to which my invention is especially applicable is one of employment in a large foundry where molding sand is to be conveyed from one location within the foundry to another, either for further use, say on molding machines or for temporary storage in a bin or bins. By the elimination of the need of constant attention by an attendant and by the conservative use of compressed air, substantial economies are effected in the operation and maintenance of the device, which constitutes a new approach to material handling, using higher pressures than normal in comparatively small pipes or conduits without requiring the use of belts and elevators.

As will hereinafter be understood, the invention involves the provision for suitably interposed jets, conveying air or other convenient fluids emanating from a source of supply to the forwarding chamber or filling hopper of the conveyor system, the invention employing jets with the materials to be conveyed thereby introducing compressed air or other convenient fluids as the vehicle in combination with such controls as pressure regulating valves or the like.

Other objects and advantages will become more readily apparent in connection with drawings, in which Fig. 1 is a perspective view of the novel conveyor embodying my invention.

Similar reference numerals refer to similar parts throughout the figures.

Figures 1, 2, 3:
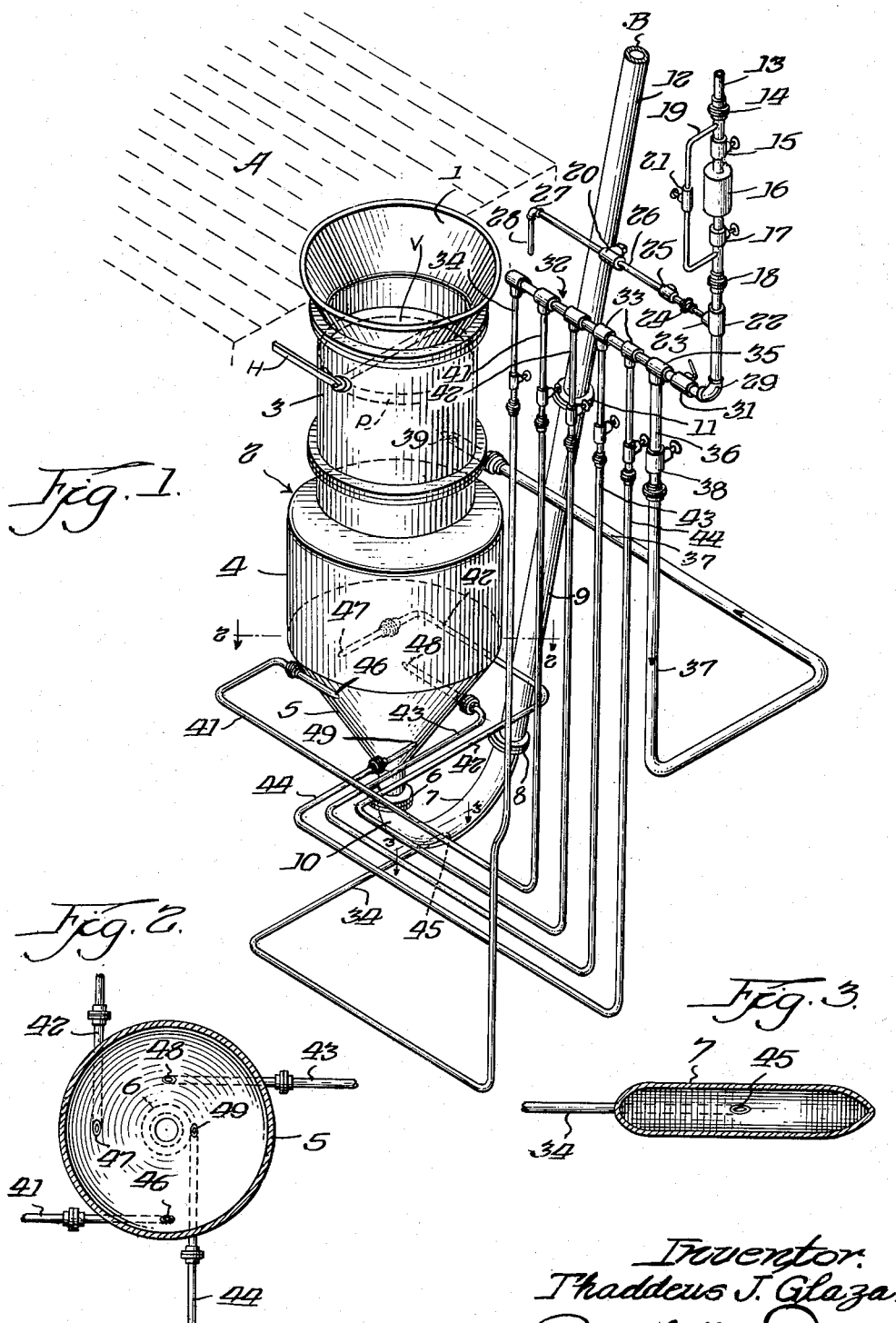
Fig. 2 is a sectional view taken on the line 2—2 of Fig. 1.
Fig. 3 is a sectional view taken on the line 3—3 of Fig. 1.

Referring now to Fig. 1, let it be assumed at the outset that the opening 1 is located on an upper floor A of a foundry, the portion so designated constituting a feeder opening for the sand or other finely divided material which is to be transported from the floor A and is carried back by conduit means hereinafter explained in more detail to a discharge B communicating with a sand receiver or series of bins (not shown). The system consists of the forwarding chamber or vessel, generally designated 2, which comprises the neck portion 3 and the lower chamber 4 for direct communication with the funnel portion 5. At the lower end portion of the latter member, a suitable fluid sealing joint 6 is provided having a tight connection with the bend 7. The latter member is preferably formed with the end 10 adjoining the funnel 5 extended upwardly, as illustrated, and being connected by a second fluid sealing joint 8 to a straight length of pipe 9, preferably connected by means of the joint 11 to the conduit 12, communicating with the discharge B to a sand receiver not shown.

It has been found desirable that when introducing to the forwarding chamber 2 and the funnel 5 such finely divided solids as sand, positive means should be employed to prevent bridging or clogging of the conveyed materials within the forwarding chamber or hopper and funnel during the course of moving such material within the conveyor system.

It has been found that if jets of air under relatively high pressure, say of the order of one hundred pounds per square inch, are properly directed at suitable locations within the forwarding chamber assembly comprising the loading hopper 3, the enlarged chamber 4 and the funnel 5, and thence into the bend or elbow fitting 7, the danger of such clogging or bridging by the sand is substantially avoided. Thus, let it be assumed that the conduit 13 is connected to a suitable source of air supply by means of the union fitting 14. A shut-off valve 15 is preferably employed adjacent to a pressure regulator 16, having attached at its outlet end a second stop valve 17, and for convenience of attachment is connected to a union fitting 18, located as indicated. Preferably, between the union 14 and the stop valve 15, a by-pass inlet connection 19 is applied as illustrated to the air inlet conduit 13, the by-pass preferably being controlled by means of a shut-off valve 21. The by-pass 19 merely serves as a means for permitting the servicing of the regulator 16, when necessary, without interfering with or shutting down the air inlet supply. The conduit 13 is connected with the T 22, the latter having a side outlet, as at 23, a union 24, and a safety valve 25. Beyond the safety valve 25, the tubing 26 connects with a 3-way valve 20 and the elbow 27. The latter fitting communicates at 28 with an air cylinder (not shown). It will, of course, be appreciated that the purpose of the air cylinder is to provide for a safety means in the event that the fluid pressure becomes excessive or that the method or manner of operation produces impacts within the system, such as fluid hammers, which might otherwise prove harmful to the piping assembly.

At the lower end of the tubing inlet air supply conduit 13, an elbow fitting 29 is positioned, preferably connected to a quick opening stop and control valve 31. At this location, a header, generally designated 32, is provided consisting of a series or a plurality of T's 33 having the outlets 34. One of the T's, such as 35, is preferably larger to provide the side outlet 36 and, as indicated by the discharge passage 37 is provided with a stop valve 38 leading, as indicated by the direction of the arrows to the interior of the chamber 3, as indicated at 39. The function of such inlet air supply to the lower portion of the upper portion of the forwarding chamber will be explained at greater length. The respective smaller outlets 34, 41, 42, 43, and 44 in the different planes are relatively easily traced, as indicated, by the respective numerals referring to each in remote portions of the figure.

As shown in Fig. 3, the air outlet 34 terminates at the jet opening 45 entering preferably in the lowermost portion of the bend 7. It has been found desirable to have the latter jet enter preferably at a point of tangency relative to the internal curved walls of the bend for reasons hereinafter explained. The outlet 41 enters at an upper plane of the funnel 5, the jet entrance being designated 46. In a plane slightly lower than the jet opening 46, the outlet 42 finds the point of entry at the jet opening 47 below the jet opening 46. The air outlet 43 terminates in a lower plane in a jet outlet opening at 48, as indicated. In a still lower plane, and below the jets 46 and 47, the outlet 44 terminates in a jet outlet 49 in the lowest plane of the funnel 5, which relative positions are more clearly shown in Fig. 2.

The amount of air pressure employed in entering the respective jets 39, 46, 47, 48, and 49 will, of course, vary with the amount of semi-solid materials being conveyed. It is preferably controlled automatically by means of the pressure regulator 16 at the inlet air supply 13.

While in the course of this description reference is made only to four inlets for supplying the air to the jets, it should, of course, be obvious that the number of jets employed will vary with the size or volume of the forwarding chamber 2 and the funnel 5.

In actual operation, it has been found that air pressure does not accumulate in objectionable volume within the chamber 4, apparently in view of the desirable aspiratory effect created by the interposition of the jet 45 entering at the heel of the hollow bend fitting 7. Locating the relatively larger size jet opening 39 at a peripheral portion of the entering chamber 3, provides for the establishment of an agitating action within such chamber, causing the sand to be swirled around over the surfaces of the walls of the forwarding chamber and subsequently moving downwardly into the enlarged portion 4 preparatory to being received within the funnel 5. Any clinging to the walls of the funnel or to bridge across is overcome by the discharged streams from the respective jet outlets of the forwarding chamber and bend. It might be explained here that while the jets are preferably located ninety degrees apart and in different planes, the final determination of such locations will depend upon the length, size, and volume of the material being handled. In some cases, for example, only two jets may be sufficient, such as the outlet 47 and the outlet 49, dispensing with the intermediate jets 46 and 48. In other cases, substantially more than the five jets illustrated may be required to perform the function properly of moving the sand.

Heretofore, the problems of rapidly removing finely divided material from the hopper and from the funnel has led to clogging, congestion and frequently to overflow, and required the use of a control member such as a diaphragm valve, or the like in the sand supply system, so that a valve piston or other form of positive shut-off would permit controlling the amount of sand to be supplied to the inlet chamber. Under such circumstances, however, it has been necessary that the cycle of operations be stopped until the material to be conveyed has been drawn from the delivery chamber. In the instant type of construction, such expensive and unreliable methods have been found to be unnecessary, because in actual operation, sand has been piled on the floor A virtually over the top of the chamber 1 without causing any difficulty in the operation of the device. It should, of course, be appreciated that the chamber 3 after loading with sand may be closed at its filler neck by a valve designated V and actuated by a handle H or its equivalent. The valve is preferably pressure sealed at its periphery P, thereby to convert the chamber into a closed pressure vessel when the air pressure therewithin is introduced at the jets 39 and below. Thus, any pressure accumulating above the sand fill will also tend to move the accumulated sand therewithin downward into the funnel 5 to aid in its movement through the system. So long as the jets of air are operating, it has been found there is no real danger of clogging from within the container, and while the finely divided materials are supplied to the system, it will be conveyed without regard to whether the use of the end delivery or the storage chamber exceeds the maximum capacity.

Certain apparatus has been described and illustrated which structure results in the rapid and economical movement of sand under relatively high velocities, so that the outlet end of the funnel 5 is substantially free to deliver the sand received. It will, of course, be appreciated that the apparatus described will accomplish the purpose of the invention by various other forms of apparatus which may also be utilized to accomplish the purpose as hereinabove set forth. Similarly, many detailed parts of the assembly may be modified or changed without departing from the essential features or without sacrificing any of the advantages of my invention.

As being new and embodying the principles exemplified by the particular example shown, I desire to secure by Letters Patent the following.

I claim:

1. In a conveyor system for use with a receiver or the like, the combination comprising a forwarding chamber having an inlet opening, an enlarged chamber below said inlet opening, a funnel directly communicating with the said enlarged chamber, the said latter chamber defining the upper limits of the said funnel, air jet means interposed at the inlet opening to discharge transversely thereinto, a plurality of air inlets discharging tangentially at different planes and directions into the interior of the said funnel to prevent conveyed material from bridging within the said chamber and funnel, the said air inlets having independent valve means for selectively supplying air to said inlets, an elbow fitting having a lower sweep portion communicating with the small end of the funnel, a single air jet means discharging into the sweep portion of the said elbow fitting thereby to create an aspiratory effect upon the flow of conveyed material moving from the small end of the funnel directly into the sweep of the said elbow fitting, and conduits connected with said first and second named air jets means communicating with an air supply.

2. In a conveyor system for use with a receiver or the like, in combination comprising a forwarding chamber having an inlet opening, an enlarged chamber immediately below said inlet opening a funnel communicating with the said chamber, the said latter chamber being substantially of the same diameter as the upper limits of the said funnel, air jet means interposed at the inlet opening adjacent the upper limits of the enlarged chamber to discharge transversely into said inlet opening, a plurality of air inlets discharging tangentially into the funnel to prevent conveyed material from bridging within the said chamber and funnel, each of said air inlets being positioned in a different plane, an elbow fitting having a continuous sweep portion communicating with the small end of the funnel, a single air jet means discharging tangentially into the sweep portion of the said elbow fitting to create an aspiratory effect upon the flow of conveyed material moving from the small end of the funnel directly into the sweep of said elbow fitting, and a header comprising a plurality of conduits connected with said first and second named air jet means communicating with an air supply.

3. In a conveyor system for use with a receiver or the like, in combination comprising a forwarding chamber having an inlet opening, an enlarged chamber below said inlet opening, a funnel depending from the said chamber, the said latter chamber defining the vertical wall portion above the said funnel, air jet means interposed at the inlet opening to discharge thereinto, a plurality of air inlets therefor, at least one of said inlets discharging tangentially at a different plane and in a different direction from the other into the said funnel to prevent conveyed material from bridging within the said chamber and funnel, an elbow fitting with a lower extending sweep portion communicating with the small end of the funnel, the opposite end of the fitting communicating with the receiver, a single air jet means discharging into the lowermost inner portion of the said elbow fitting to create an aspiratory effect upon the flow of conveyed material moving from the small end of the funnel directly into the said elbow fitting, pressure relief means and conduits connected with said first and second named air jet means communicating with an air supply to regulate the maximum pressure of the conveyed material.

4. In a conveyor system for use with a receiver or the like, the combination comprising a forwarding chamber having an inlet opening, an enlarged chamber below said inlet opening, a funnel directly communicating with the said enlarged chamber, the said latter chamber defining the upper limits of the said funnel, air jet means interposed at the inlet opening to discharge transversely thereinto, a plurality of air inlets discharging tangentially at different planes and directions into the interior of the said funnel to prevent conveyed material from bridging within the said chamber and funnel, the said air inlets having independent valve means for selectively supplying air to said inlets, an elbow fitting having a lower sweep portion communicating with the small end of the funnel, air jet means discharging into the sweep portion of the said elbow fitting thereby to create an aspiratory effect upon the flow of conveyed material moving from the small end of the funnel directly into the sweep of the said elbow fitting, and conduits connected with said first and second named air jet means communicating with an air supply.

References Cited in the file of this patent

UNITED STATES PATENTS

| 1,746,395 | Herdemerten | Feb. 11, 1930 |
| 1,933,543 | Anderson | Nov. 7, 1933 |
| 1,935,843 | Goebels | Nov. 21, 1933 |
| 1,942,379 | Thompson | Jan. 2, 1934 |

FOREIGN PATENTS

| 268,667 | Great Britain | Apr. 7, 1927 |
| 331,322 | Great Britain | July 3, 1930 |
| 641,056 | France | July 27, 1928 |